Patented Jan. 10, 1939

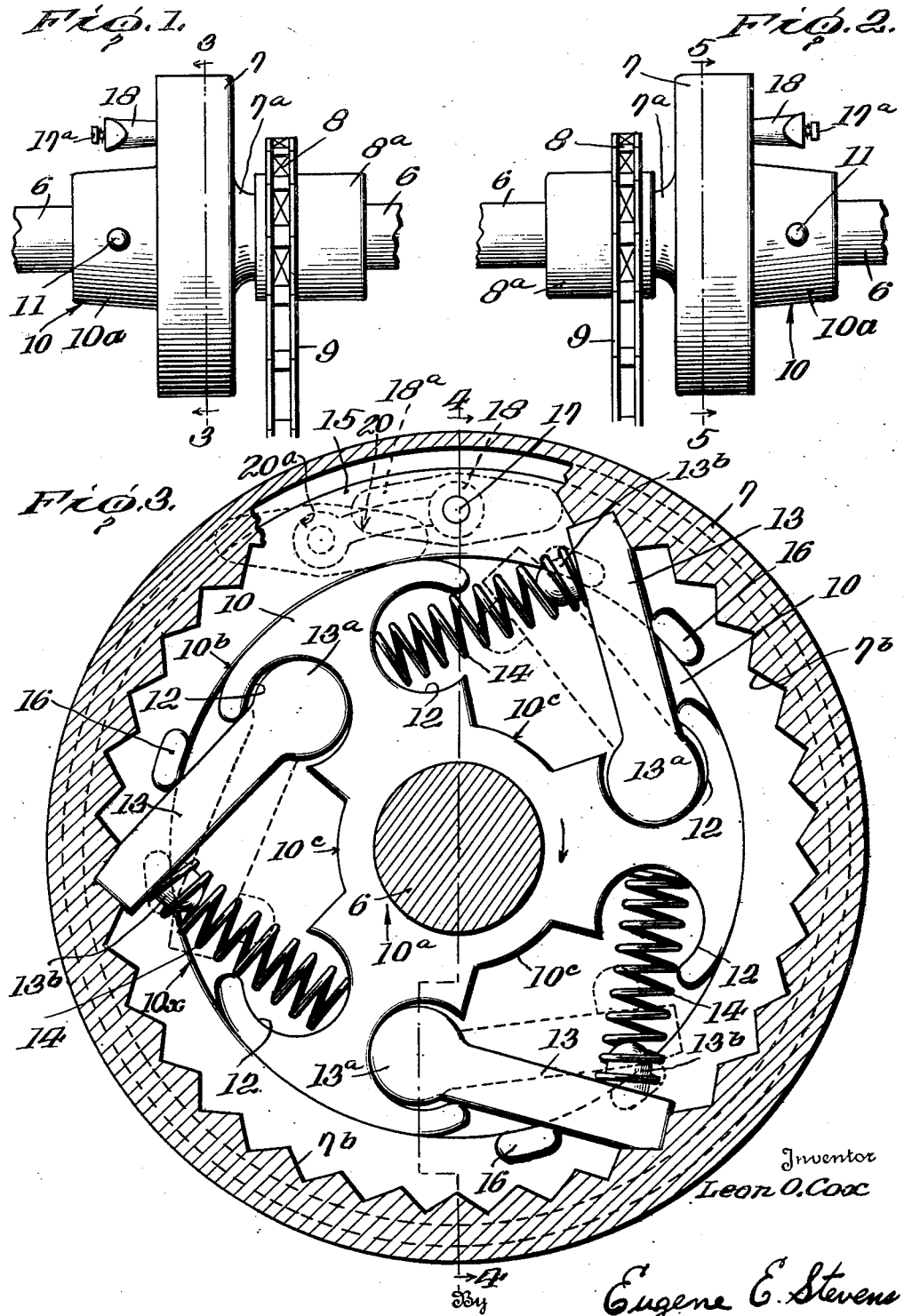

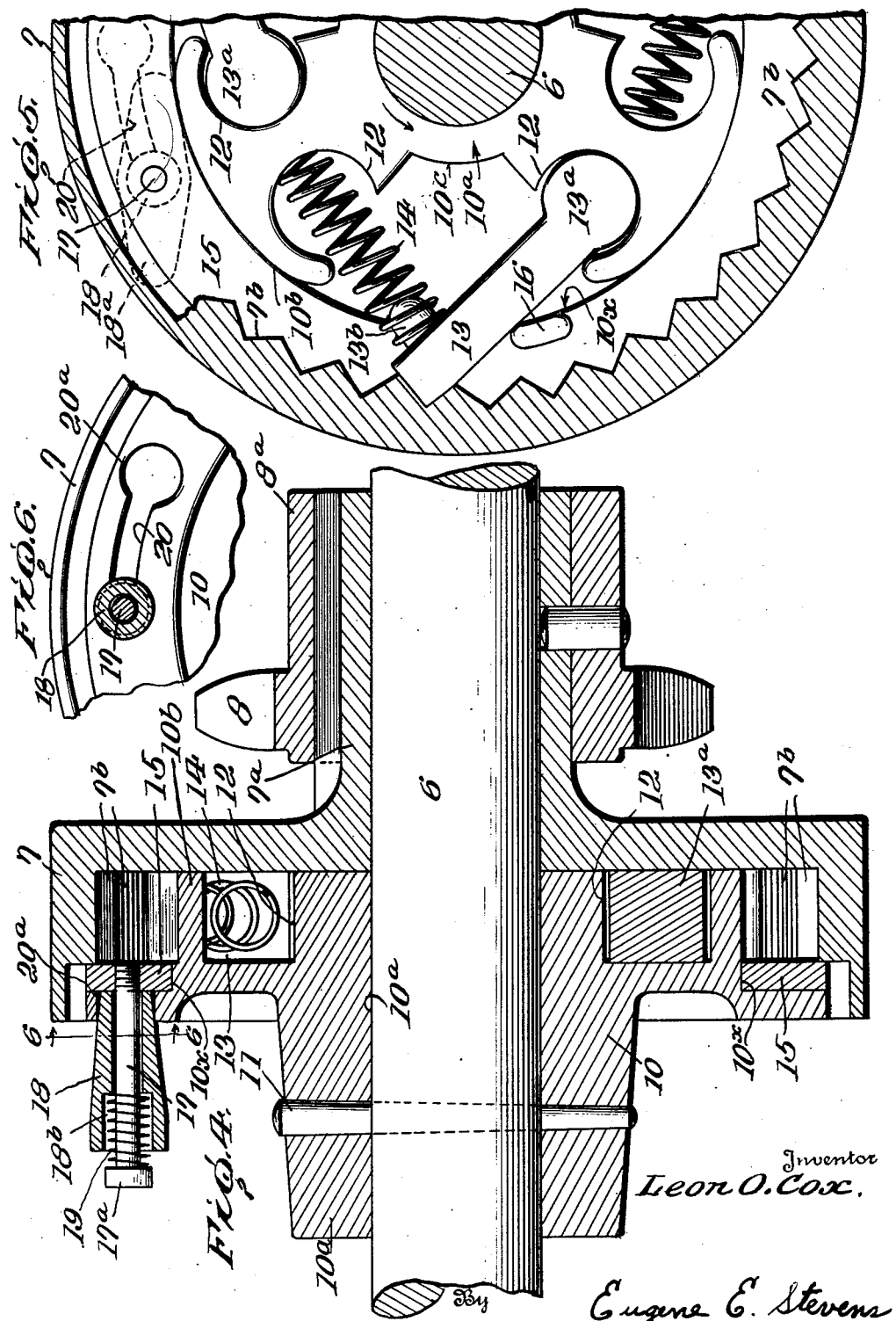

2,143,121

UNITED STATES PATENT OFFICE 2,143,121

CLUTCH

Leon Oscar Cox, Grifton, N. C.

Application November 24, 1937, Serial No. 176,318

3 Claims. (Cl. 192—43.1)

My invention relates to improvements in clutches for power transmission and while I have designed this clutch for use in driving a soy bean harvesting mechanism from the live axle of a wheeled soy bean harvester machine, it is to be understood that same is useful for many other purposes too numerous to mention.

Briefly and generally, the invention has for its object to provide a clutch for the purpose stated which will be of simple, durable and inexpensive construction, highly efficient in practical use, and easy to operate and keep in repair.

Additionally, the invention aims to provide a clutch for the stated, and other purposes, which may be utilized as either a "right hand" or a "left hand" clutch—or in other words one wherein internal parts may be simply reversed, as it were, to effect drive of the driven clutch element in one or the other direction.

Furthermore, and more specifically stated, the invention aims to provide a clutch embodying pawl elements and actuating springs therefor; and wherein one element of the clutch provides recesses for interchangeably receiving either a pawl or an actuating spring therefor.

It is also an object of the invention to provide in a clutch of this kind, a novel means which is easily operated to lock the clutch elements in either operative or inoperative position—and which preferably, although not necessarily, takes the form of a ring which is carried by one of the clutch elements.

Other objects and advantages of the invention reside in certain novel features of construction, combination and arrangement of the various parts and in modes of operation thereof, all of which will be understood and appreciated by those skilled in the art upon a reading of the following descriptive matter in connection with the accompanying drawings, wherein—

Figure 1 is an elevational view, partly broken and partly in section of a driven, mechanism-actuating shaft of a soy bean harvester, which incorporates a clutch embodying my invention;

Figure 2 is a similar view but illustrating a clutch arranged for "left hand" drive as contradistinguished to the "right hand" drive of the clutch shown in Figure 1;

Figure 3 is a sectional view taken on the line 3—3 of Figure 1;

Figure 4 is a sectional view taken on the line 4—4 of Figure 3;

Figure 5 is a fragmentary sectional view taken on the line 5—5 of Figure 2;

Figure 6 is a detail view taken on line 6—6 of Figure 4 and which shows means for locking the clutch parts in either operative or inoperative position.

Referring to the drawings by reference characters, numeral 6 designates a driven shaft which, in the present application of my clutch is the mechanism-driving shaft of a soy bean harvester.

The driven shaft 6 carries the loose clutch element which comprehends the cup-like member 7 having the circumferential series of teeth 7b and whose hub 7a is mounted on the said shaft. On said hub 7a is keyed or otherwise fixedly secured the hub 8a of a sprocket gear 8 which has the chain or other drive connection 9 with a suitable drive means—such as for instance, the live axle (not shown) of a soy bean harvester machine.

Keyed as at 11 to driven shaft 6 is the hub 10a of the driven clutch element 10. Said clutch element 10 comprises a disk which is reduced to provide the medial boss 10b and circumferential shoulder 10x.

The medial boss 10b of the driven clutch disk 10 is provided with a series of peripheral bearing cutouts 12 which are separated by gaps 10c. These cutouts 12 are arranged in substantially opposed pairs as shown in Figures 3 and 5. When the clutch members 7, 10 are to be set for "right-hand" drive, as in Figure 3, the bearing ends 13a of pawls 13, whose outer ends are adapted to engage teeth 7b, will be located in one bearing cutout 12 of each pair and a sustaining spring 14 for such pawl 13 will be located in the opposed cutout 12. Each pawl carries a spring seating pin 13b, as shown.

However, when the clutch is to be set for "left-hand" drive, as in Figures 2 and 5 as contradistinguished to the "right-hand" drive, shown in Figures 1 and 3, the position of the bearing ends of the pawls 13 and springs 14 will be reversed. Therefore, the clutch of my invention has the very decided advantage of lending itself to reversal installation by the very simple expedient of interchange of position of two simple internal parts. Standardization of parts is a great manufacturing advantage from the point of view of economy and it will be appreciated that I have accomplished this by making my clutch reversible so that it can be used as either a right-hand or left-hand clutch, as above stated. In either event, springs 14 urge the outer ends of pawls 13 into engagement with the teeth 7b of the drive element of the clutch—namely cup member 7.

As the means for disengaging pawls 13 from teeth 7b—whether the drive be "right-hand" or "left-hand"—I provide the ring 15. This ring 15 seats upon the shoulder 10x of disk 10 about the boss 10b. This ring 15 has the axially extending pawl actuating lugs 16. The shifting means for ring 15 comprises the pin 17 which extends outwardly through the slot 20 in disk member 10. The ends of slot 20 are enlarged, as shown, to selectively receive the inner end of the latch sleeve 18 which is slidably carried on the pin 17. Sleeve 18 is normally urged toward the ring 15 by means of the pin-carried coil spring 19 which has one end bearing against the head 17a of the pin and the other end seating against the inner end of a counterbore 18b of said sleeve.

The outer end of sleeve 18 has the head grip-providing wings 18a as shown by means of which the inner end of the sleeve is pulled out of one slot enlargement and the ring 15 shifted to change the relation of pawls 13 to the ratchet teeth 7b.

From the foregoing description taken in connection with the accompanying drawings, it is believed that the advantages of my clutch will be readily appreciated by those skilled in the art. The device comprises a minimum number of very sturdy and durable parts. The manner of assembly is likewise simple. When it is desired to reverse the drive of the clutch, it is only necessary to reverse the position of the pawls 13 and springs 14—which is to say putting the bearing ends of the pawls 13 in the recesses 12 which, as shown in Figure 3, are receiving the inner ends of the springs 14. It is an easy matter to shift the ring 15 so that its lugs 16 will actuate the pawls 13 out of engagement with the ratchet teeth 7b when it is desired to break the driving connection between disk 10 and cup member 7.

I claim:

1. The combination of a clutch comprising driving and driven clutch members, one of said clutch members comprising a cup member having a circumferential flange, a series of teeth on the interior surface of said flange, said second clutch member comprising a disc insertable within said cup member, said disc providing a boss-like extension defining a shoulder, said boss-like extension having peripheral and substantially opposed bearing recesses and an intermediate cut-out therebetween, a pawl member having bearing ends selectively and removably positionable in said recesses and adapted to engage said teeth, a spring member insertable in the companion one of said recesses and engageable with the adjacent pawl for actuating the same against said teeth, a ring member seated on said shoulder and extending about said boss, said ring member having inwardly engaging pawl actuating lugs adapted to engage said pawl to actuate the same away from the teeth when the ring is moved in one direction whereby to break the driving connection between the clutch elements, said disk member having a slot providing end engagements, a post extending outwardly from said ring and through said slot whereby said ring can be actuated, and latching means carried by said pin and engageable in said slot enlargements whereby to lock said ring in a predetermined position.

2. The combination of a clutch comprising driving and driven clutch members, one of said clutch members comprising a cup member having a circumferential flange, a series of teeth on the interior surface of said flange, said second clutch member comprising a disc insertable within said cup member, said disc providing a boss-like extension defining a shoulder, said boss-like extension having peripheral and substantially opposed bearing recesses and an intermediate cutout therebetween, a pawl member having bearing ends selectively and removably positionable in said recesses and adapted to engage said teeth, a spring member insertable in the companion one of said recesses and engageable with the adjacent pawl for actuating the same against said teeth, a ring member seated on said shoulder and extending about said boss, said ring member having inwardly engaging pawl actuating lugs adapted to engage said pawl to actuate the same away from the teeth when the ring is moved in one direction whereby to break the driving connection between the clutch elements, and actuating means for said ring for operating the latter to disengage the pawls from said teeth.

3. The combination of a clutch comprising driving and driven clutch members one of said clutch members comprising a cup member having a circumferential flange, a series of teeth on the interior surface of said flange, said second clutch member comprising a disc insertable within said cup member, said disc providing a boss-like extension defining a shoulder, said boss-like extension having peripheral and substantially opposed bearing recesses and an intermediate cutout therebetween, a pawl member having bearing ends selectively and removably positionable in said recesses and adapted to engage said teeth, a spring member insertable in the companion one of said recesses and engageable with the adjacent pawl for actuating the same against said teeth, a ring member seated on said shoulder and extending about said boss, said ring member having inwardly engaging pawl actuating lugs adapted to engage said pawl to actuate the same away from the teeth when the ring is moved in one direction whereby to break the driving connection between the clutch elements, actuating means for said ring for operating the latter to disengage the pawls from said teeth, and means associated with one of said clutch members and ring and removably engageable with the other clutch member to latch said ring in a predetermined position.

LEON OSCAR COX.